US006900960B2

(12) United States Patent
Gariepy et al.

(10) Patent No.: US 6,900,960 B2
(45) Date of Patent: May 31, 2005

(54) MULTI-RECEIVER CARTRIDGE TRANSPORT SYSTEM

(75) Inventors: Jeffrey A. Gariepy, West Boylston, MA (US); Daniel P. Zwarych, Framingham, MA (US); Carl Swanson, Shrewsbury, MA (US); Daniel Kloss, Belchertown, MA (US)

(73) Assignee: Quantum Corporation, San Jose, CA (US)

(*) Notice: Subject to any disclaimer, the term of this patent is extended or adjusted under 35 U.S.C. 154(b) by 137 days.

(21) Appl. No.: 10/029,112

(22) Filed: Oct. 19, 2001

(65) Prior Publication Data

US 2003/0076619 A1 Apr. 24, 2003

(51) Int. Cl.[7] .............................................. G11B 15/68
(52) U.S. Cl. .................. 360/92; 369/30.43; 369/30.45; 369/30.49
(58) Field of Search .......................... 360/92; 369/30.43, 369/30.45, 30.49

(56) References Cited

U.S. PATENT DOCUMENTS

| 4,275,425 | A | | 6/1981 | Watanabe et al. | |
|---|---|---|---|---|---|
| 4,815,056 | A | * | 3/1989 | Toi et al. ................. | 369/30.43 |
| 4,907,889 | A | | 3/1990 | Simone | |
| 4,932,826 | A | | 6/1990 | Moy et al. | |
| 4,937,690 | A | * | 6/1990 | Yamashita et al. ............ | 360/92 |
| 4,954,918 | A | * | 9/1990 | Shiosaki ................... | 360/98.06 |
| 5,001,582 | A | * | 3/1991 | Numasaki ................ | 360/98.06 |
| 5,056,073 | A | * | 10/1991 | Fitzgerald et al. ........ | 369/30.73 |
| 5,418,664 | A | * | 5/1995 | Ostwald ...................... | 360/92 |
| 5,449,091 | A | | 9/1995 | Dalziel | |
| 5,498,116 | A | | 3/1996 | Woodruff et al. | |
| 5,638,349 | A | * | 6/1997 | Rugg et al. ............... | 369/30.43 |
| 5,652,682 | A | | 7/1997 | Elliott | |
| 5,659,434 | A | | 8/1997 | Yamakawa et al. | |
| 5,760,995 | A | | 6/1998 | Heller et al. | |
| 5,925,119 | A | | 7/1999 | Maroney | |
| 6,064,544 | A | * | 5/2000 | Wada ........................ | 360/92 |
| 6,327,113 | B1 | * | 12/2001 | Mueller et al. .............. | 360/92 |
| 6,441,991 | B2 | * | 8/2002 | Ostwald et al. .............. | 360/92 |
| 6,496,325 | B1 | * | 12/2002 | Kersey et al. ................ | 360/92 |
| 2003/0002201 | A1 | * | 1/2003 | Gupta et al. .................. | 360/92 |

FOREIGN PATENT DOCUMENTS

| EP | 280263 | A2 | * | 8/1988 | .......... G11B/17/22 |
|---|---|---|---|---|---|
| EP | 284445 | A1 | * | 9/1988 | .......... G11B/17/22 |
| EP | 0 288 165 | | | 10/1988 | |
| EP | 0 377 474 | | | 7/1990 | |
| JP | 60224143 | A | * | 11/1985 | .......... G11B/17/22 |
| JP | 62239372 | A | * | 10/1987 | .......... G11B/15/68 |
| JP | 63244440 | A | * | 10/1988 | .......... G11B/15/68 |
| JP | 60282918 | A | * | 10/1994 | .......... G11B/17/22 |
| JP | 2000251373 | A | * | 9/2000 | .......... G11B/17/22 |

* cited by examiner

*Primary Examiner*—William J. Klimowicz
(74) *Attorney, Agent, or Firm*—James P. Broder; Steven G. Roeder

(57) ABSTRACT

A storage system (10), including a transport assembly (18) for moving a plurality of cartridges (26) between a storage rack (12) and a tape drive (14) includes a guide (32), a transport mover (30), a transporter (28) and a cartridge mover (34). The guide (32) extends between the storage rack (12) and the tape drive (14). The transport mover (30) moves the transporter (28) along the guide (32) between the storage rack (12) and the tape drive (14). The transporter (28) selectively receives the cartridges (26) and includes a first transport receiver (36A) and a second transport receiver (36B) that can each receive and transport one of the cartridges (26). With this design, while one cartridge (26) is being used by the tape drive (14) the transport assembly (18) can retrieve another cartridge (26) from the storage rack (12) for immediate insertion into the tape drive (14) upon rewinding of the first cartridge (26). As a consequence, the transport assembly (18) facilitates an increase in throughput of the storage system (10).

41 Claims, 6 Drawing Sheets

MULTI-RECEIVER CARTRIDGE TRANSPORT SYSTEM

FIELD OF THE INVENTION

The present invention relates generally to digital storage systems. More specifically, the present invention relates to a transport assembly for transferring cartridges between a storage rack of a storage system and a tape drive, and a method for transferring cartridges between a storage rack of a storage system and a tape drive.

BACKGROUND

Automated storage systems are used for storing and retrieving relatively large amounts of information in digital form. One type of storage system includes one or more individual storage racks that are positioned adjacent to each other. With this type of system, each storage rack can include a storage rack housing, a plurality of cartridges retained in a plurality of tape receivers within the storage rack housing, a robotic cartridge handling mechanism and one or more tape drives. The robotic cartridge handling mechanism individually retrieves one of the cartridges from one of the tape receivers and places the cartridge within one of the tape drives.

Typically, a cartridge is retrieved by a transport assembly from a storage rack, and is transported to the tape drive. The transport assembly then remains stationary while the cartridge is in use. Following usage of the cartridge in the tape drive, the cartridge is typically fully rewound and is then ejected from the tape drive into the transport assembly. The transport assembly then returns the cartridge to the appropriate location within the storage rack, and proceeds to the next tape receiver to retrieve another cartridge to transport to the tape drive.

Unfortunately, these transport assemblies are not completely satisfactory. In particular, the typical cycle outlined above is a time-consuming process with a substantial downtime while the tape drive is reloaded with another cartridge. This transport cycle can have a duration of up to or in excess of ten seconds. This repeated process adds up to a substantial amount of time over the course of dozens or hundreds of such cycles that can occur in a single day. Spread over a month or a year, this can amount to many hours or even days of unproductive waiting time. Thus, excessive delays in transporting cartridges result in a significant decrease in throughput of the storage system.

In light of the above, the need exists to provide an improved transport assembly that transfers a cartridge from a storage rack to a tape drive. Another need exists to provide a transport assembly that significantly reduces the time necessary to reload the tape drive. Still another need exists to provide a transport assembly that minimizes movement of the transport assembly during a transport cycle. Yet another need exists to provide a storage system having improved efficiency, which is relatively easy and cost efficient to manufacture and utilize.

SUMMARY

The present invention is directed to a storage system including a transport assembly for moving a first cartridge and a second cartridge between a storage rack and a tape drive that satisfies these needs. The transport assembly can include a guide, a transport mover, a transporter and a cartridge mover. The guide extends substantially between the storage rack and the tape drive. The transport mover moves the transporter along the guide between the storage rack and the tape drive.

The transporter includes a first transport receiver that receives the first cartridge and a second transport receiver that receives the second cartridge. With this design, for example, the transporter can retrieve the second cartridge while the first cartridge is being used by the tape drive. The second cartridge is now ready for insertion into the tape drive immediately upon rewinding of the first cartridge. This design results in a decrease in downtime, and an increase in throughput of the storage system.

Further, the cartridge mover includes a first gripper assembly and a gripper mover that moves the first gripper assembly in a first direction and a second direction that is substantially perpendicular to the first direction. With this design, cartridges can be received by either transport receiver during transport between the tape drive and the storage rack.

Additionally, the present invention includes a method for transporting a first cartridge and a second cartridge between a storage rack and a tape drive. The method includes the steps of providing a transporter having a first transport receiver and a second transport receiver, transferring a first cartridge into the first transport receiver, positioning the second transport receiver near the tape drive, transferring a second cartridge from the tape drive to the second transport receiver, positioning the first transport receiver near the tape drive, and transferring the first cartridge from the first transport receiver into the tape drive. Preferably, the method also includes positioning the transporter near the storage rack, transferring the second cartridge from the second transport receiver into the storage rack, transferring a third tape cartridge into the second transport receiver, and positioning the transporter near the tape drive in preparation for transferring the first cartridge from the tape drive to the first transport receiver.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
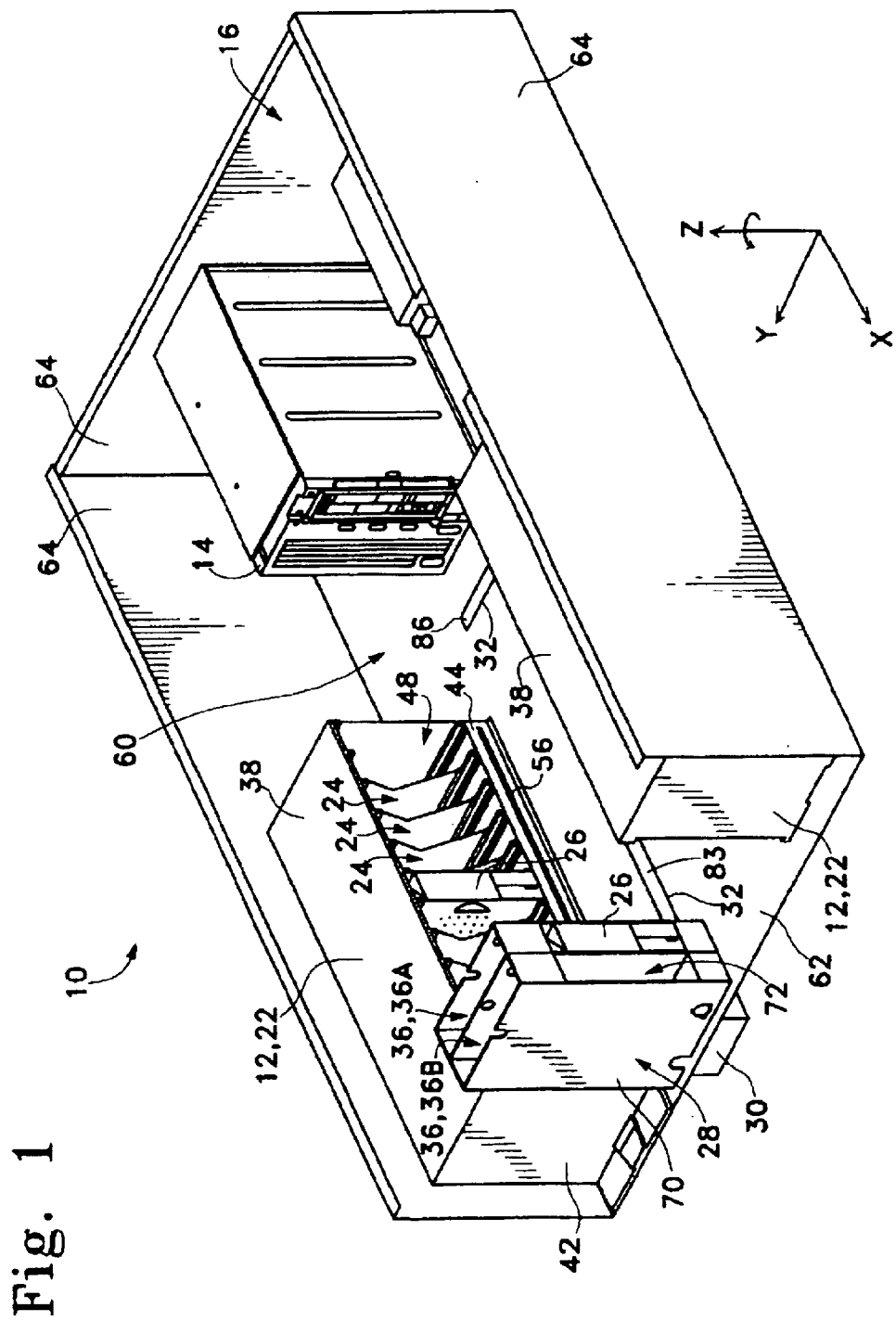
FIG. 1 is a partially cut-away, perspective view of a first embodiment of a storage system having features of the present invention.

Referring initially to FIG. 1, a storage system 10 having features of the present invention includes one or more storage racks 12, one or more tape drives 14, a system housing 16 and a transport assembly 18. Each storage rack 12 includes one or more cartridge magazines 22 typically having a plurality of tape receivers 24, each of which receive and retain a cartridge 26. The transport assembly 18 preferably includes a transporter 28, a transport mover 30, a guide 32 and a cartridge mover 34. Uniquely, the transporter 28 has a plurality of transport receivers 36 including a first transport receiver 36A and a second transport receiver 36B for selective and efficient transport of the cartridges 26 between the storage racks 12 and the tape drives 14.

Specifically, the utilization of the multiple transport receivers 36A, 36B, results in a significant decrease in downtime during the process of transferring cartridges 26 between the storage rack 12 and the tape drive 14. The design of the transport assembly 18 allows various functions to be performed while one of the cartridges 26 is "in use" by the tape drive 14, allowing greater throughput of the storage system 10. Previously, these functions could not be performed until after the "in use" cartridge 26 had been fully rewound, ejected from the tape drive 14 into the transport assembly 18, and returned to the storage rack 12.

The storage system 10 is capable of being mounted into a standard EIA 19-inch rack mount cabinet (not shown). Alternatively, the storage system 10 can be mounted or supported in any suitable cabinetry (not shown), or can be positioned on another sufficiently sturdy surface (not shown).

Figure 2:
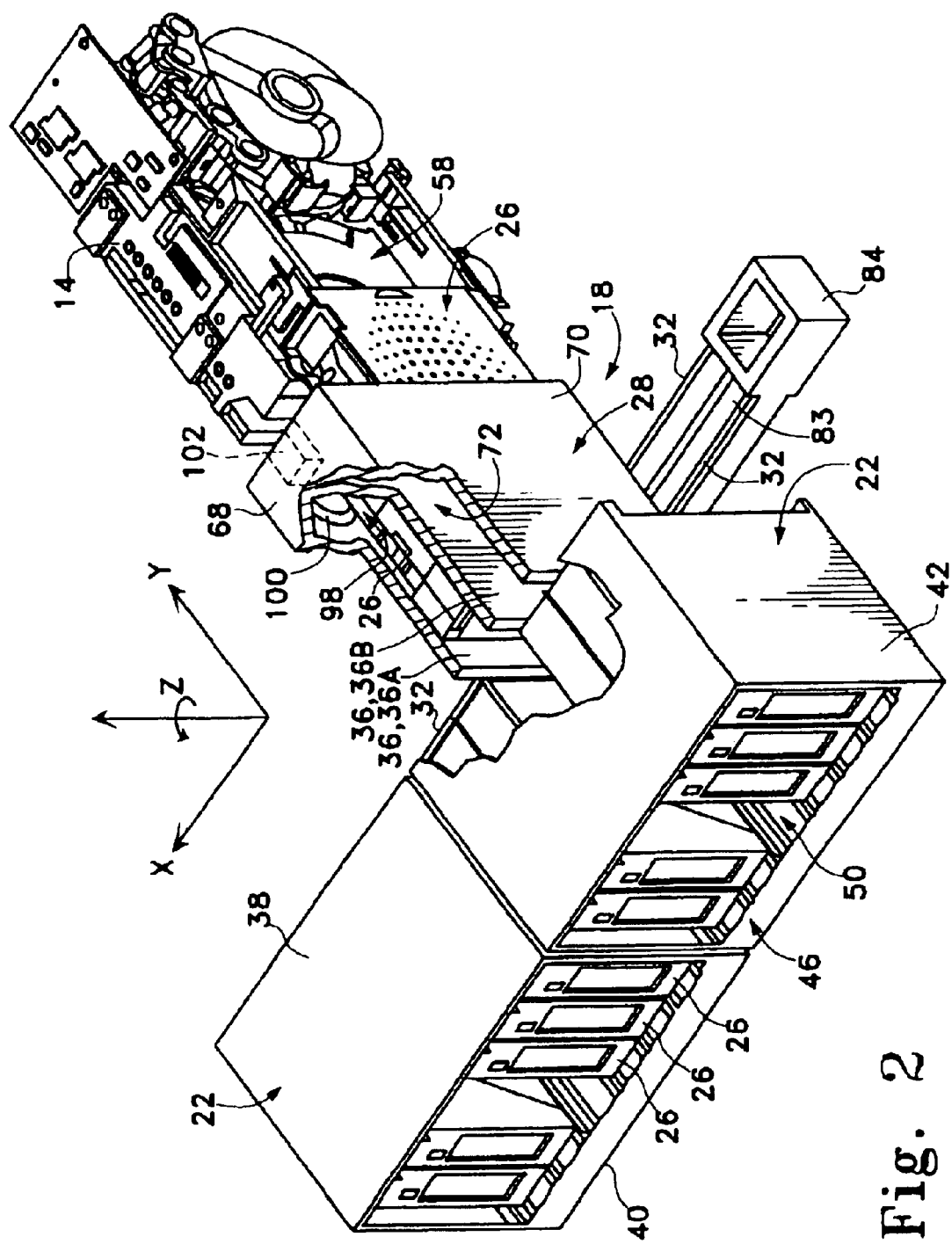
FIG. 2 is a partially cut-away, perspective view of a portion of a second embodiment of a storage system having features of the present invention.

The number and design of the storage racks 12 in the storage system 10 can be varied according to the data storage requirements. For example, FIG. 2 illustrates a storage rack 12 having two cartridge magazines 22. However, the storage system 10 can include more than one storage rack 12 (as illustrated in FIG. 1), with each storage rack 12 having any number of cartridge magazines 22.

As stated above, the number of cartridge magazines 22 in each storage rack 12 and the configuration of the cartridges 26 within each cartridge magazine 22 can be varied to suit the design requirements of the storage system 10. Each cartridge magazine 22 holds at least one cartridge 26, although cartridge magazines 22 that hold four to fourteen or more individual cartridges 26 are common. Each cartridge magazine 22 has a magazine top 38, a spaced-apart magazine bottom 40 that is generally parallel to the magazine top 38, and one or more magazine sides 42 that extend between the magazine top 38 and the magazine bottom 40.

The cartridge magazine 22 also preferably includes a front face 44 and a rear face 46. The front face 44 is typically perpendicular to at least one of the magazine sides 42. The front face 44 generally includes a front face opening 48 that allows access to the tape receivers 24. The rear face 46 is generally parallel to the front face 44, and normally includes a rear face opening 50 for viewing the cartridges 26 while in the cartridge magazine 22.

As previously indicated, each cartridge magazine 22 typically includes a plurality of tape receivers 24 for housing the cartridges 26 within the storage rack 12. The design, location and number of tape receivers 24 can be varied according to the design of the cartridges 26 and each storage rack 12. In the embodiments illustrated in the Figures, each of the tape receivers 24 defines a rectangular shaped slot that is sized and shaped to retain a single cartridge 26. In the embodiment illustrated in the FIG. 1, for example, twelve tape receivers 24 are included in each cartridge magazine 22.

Figure 3:
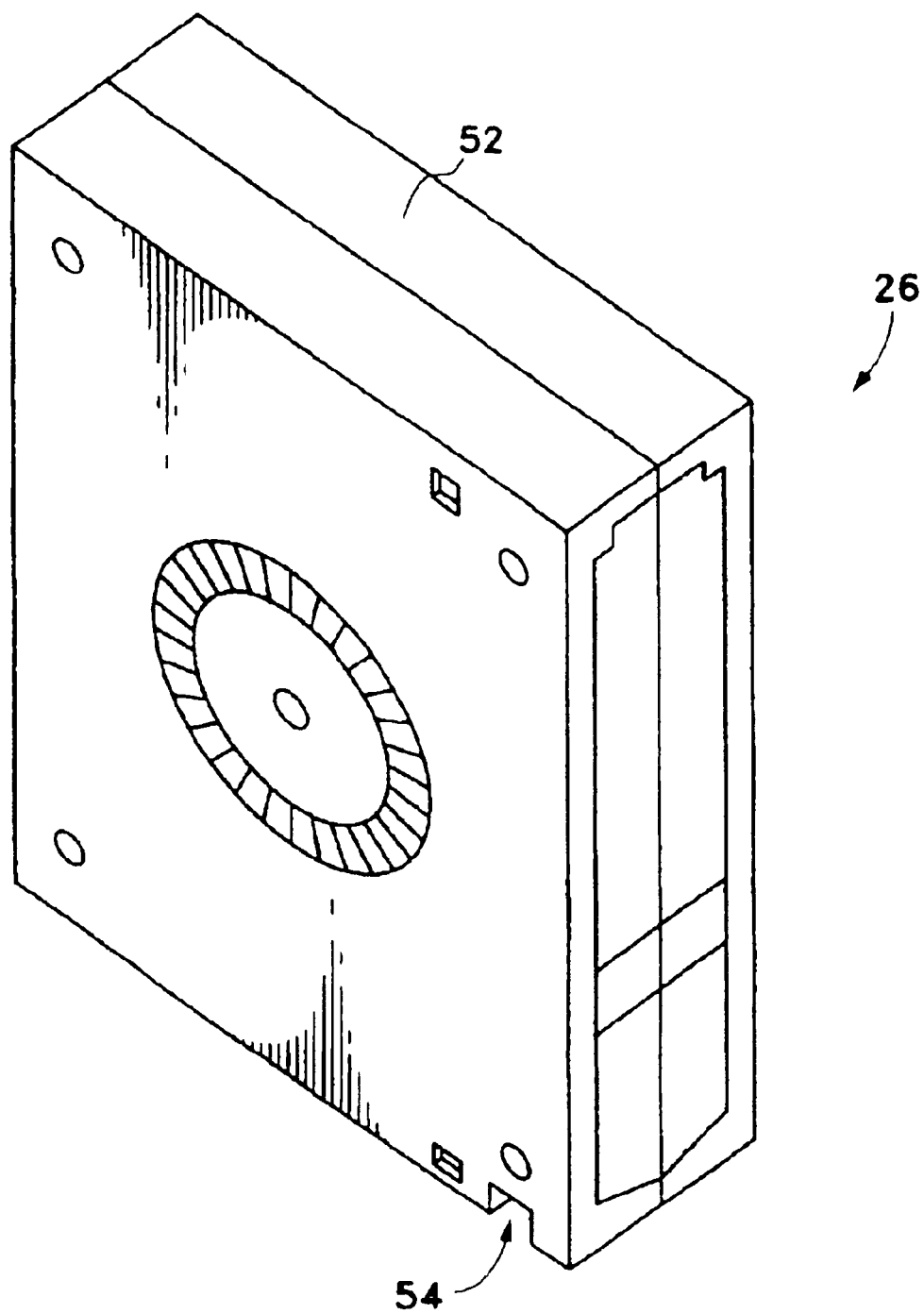
FIG. 3 is a perspective view of a cartridge having features of the present invention.
Figure 4A:
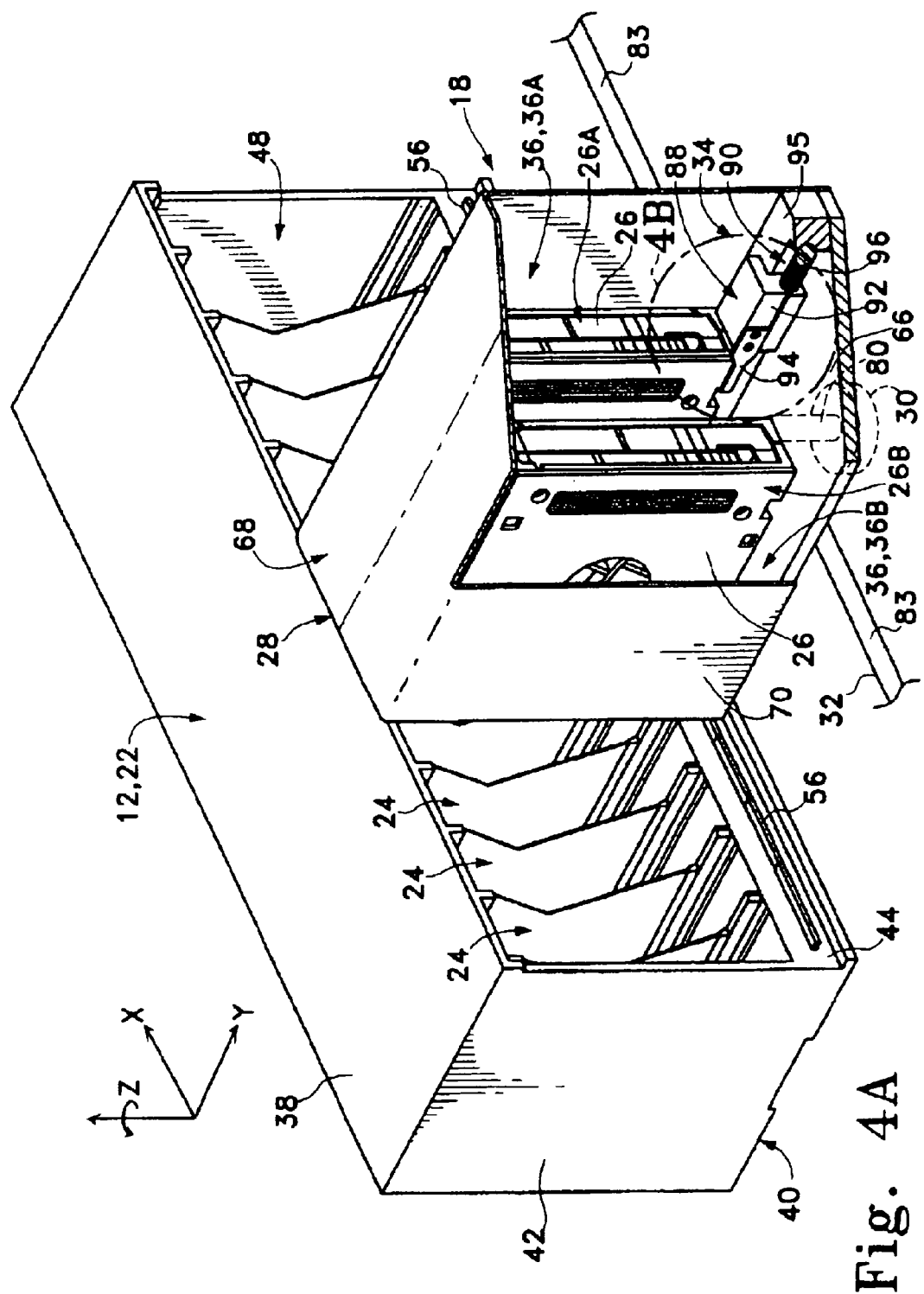
FIG. 4A is a partially cut-away, perspective view of a portion of another storage system including a transport assembly having features of the present invention.

Each cartridge 26 typically includes a storage medium (not shown) that stores data in a form that can be subsequently retrieved if necessary. A magnetic storage tape is commonly used in the cartridges to store data in digital form. Referring to FIG. 3, each cartridge 26 includes a substantially rectangular cartridge housing 52 that encloses the storage medium. The cartridge housing 52 typically includes a cartridge notch 54 that facilitates transport of the cartridge 26, as described in greater detail below. FIG. 4A illustrates that the transporter 28 can simultaneously receive a first cartridge 26A and a second cartridge 26B. It should be noted that any of the cartridges 26 can be designated as the first cartridge 26A or the second cartridge 26B. For example, a suitable cartridge 26 is sold by Quantum Corporation under the trademark DLT™, although any media cartridge 26 can be used.

Referring to FIG. 4A, each cartridge magazine 22 can also include a transporter sensor 56. The transporter sensor 56 detects appropriate alignment of the transporter 28 adjacent to the desired tape receiver 24 during transferring of one of the cartridges 26 between the transporter 28 and the cartridge magazine 22. With this setup, the transporter sensor 56 is used to stop movement of the transporter 28 when the transporter 28 is substantially aligned with the desired tape receiver 24. The design of the transporter sensor 56 can be varied. For example, the transporter sensor 56 can be an electronic optical switch positioned substantially parallel to the magazine bottom 40, on the front face 44 of the cartridge magazine 22, as shown in FIG. 4A. The specific design of the transporter sensor 56 can be varied by those skilled in the art.

The tape drive 14 transfers information to and from the cartridges 26. The design, location and the number of tape drives 14 can be varied to suit the requirements of the storage system 10. The tape drive 14 typically includes a cartridge receiver 58 that receives one of the cartridges 26 from the transporter 28, as explained below. For the embodiments provided herein, a suitable tape drive 14 is sold under the trademark DLT™, by Quantum Corporation. In the embodiment illustrated in FIGS. 1 and 2, one tape drive 14 is utilized in the storage system 10. Alternately, for example, the storage system 10 can include more than one tape drive 14.

Referring back to FIG. 1, the system housing 16 retains the various components of the storage rack 12, the tape drive 14 and the transport assembly 18. The design of the system housing 16 can be varied to suit the requirements of the storage system 10. The system housing 16 illustrated in FIG. 1 is substantially rectangular frame shaped and defines a substantially rectangular shaped storage system cavity 60. The system housing 16 typically includes (i) a housing base 62, (ii) a spaced-apart, housing cover (not shown for clarity) that is substantially parallel to the housing base 62, and (iii) one or more housing walls 64 that extend between the housing base 62 and the housing cover. The system housing 16 is typically constructed from a rigid, durable material such as metal or plastic. However, any suitable material of sufficient durability may be used for the system housing 16.

As provided above, the transport assembly 18 selectively transfers and positions the cartridges 26 between the tape magazines 22 and the tape drives 14. More specifically, the transport assembly 18 retrieves any one of the cartridges 26 from any of the tape receivers 24 and transports the cartridge 26 to any one of the tape drives 14, or to another tape receiver 24 in the storage system 10. Once the cartridge 26 within the tape drive 14 is no longer needed, the transport assembly 18 retrieves the cartridge 26 from the tape drive 14 and transports the cartridge 26 to the desired tape receiver 24. The design of the transport assembly 18 can vary depending upon the requirements of the storage rack 12 and the storage system 10.

As previously indicated, referring to FIGS. 1 and 4A, the transport assembly 18 typically includes the transporter 28, the transport mover 30, one or more guides 32 and the cartridge mover 34. The transporter 28 receives the cartridges 26 and is moved by the transport mover 30 between the storage rack 12 and the tape drive 14 along the guides 32. The design of the transporter 28 can be varied to suit the requirements of the transport assembly 18 and the storage system 10. As stated above, the transporter 28 preferably includes a plurality of transport receivers 36 including at least the first transport receiver 36A and the second transport receiver 36B. The number of transport receivers 36 included in the transporter 28 can vary depending on the requirements of the storage system 10. For example, the transporter 28 can include more than two transport receivers 36 for transporting additional cartridges 26 between the storage rack 12 and the one or more tape drives 14.

Preferably, the transport receivers 36A, 36B, are positioned side by side within the transporter 28. Each transport receiver 36A, 36B, is typically sized and shaped to accommodate one of the cartridges 26. However, the size of each transport receiver 36A, 36B, can differ from one another depending upon the size of the cartridges 26, and the requirements of the tape drives 14 within the storage system 10. Importantly, either transport receiver 36 can be the first transport receiver 36A or the second transport receiver 36B.

In the embodiments illustrated in the Figures, each transport receiver 36A, 36B, is a generally rectangular shaped opening that includes a receiver bottom 66, a receiver top 68, and opposed receiver sides 70 which define a rectangular shaped receiver slot 72. The first transport receiver 36A and the second transport receiver 36B can be formed as a unitary structure within the transporter 28, or alternatively, can be separately constructed and coupled together to form a portion of the transporter 28.

Preferably, the receiver slot 72 is sized and shaped to receive one of the cartridges 26. Thus, the design of the receiver slot 72 can be varied according to the design of the desired cartridge 26. Further, the receiver slot 72 can be designed to selectively receive two or more cartridges 26 simultaneously or alternately sized and shaped cartridges.

Further, each transport receiver 36A, 36B, can also include a cartridge retainer (not shown) for retaining the cartridge 26 within the receiver slot 72 during transport. The cartridge retainer selectively secures the cartridge 26 within the receiver slot 72 during transport between the storage rack 12 and the tape drive 14, or from one tape receiver 24 to another tape receiver 24. The cartridge retainer can be secured to the receiver top 68, the receiver bottom 66 or one of the receiver sides 70, and can exert a force against the cartridge 26 within the transport receiver 36 to retain the cartridge 26 within the transport receiver 36.

Alternatively or additionally, each transport receiver 36A, 36B, can include a latch (not shown) for retaining the cartridge 26 within the receiver slot 72. The design of the latch can vary. As provided herein, the latch moves between a locked position in which the cartridge retainer retains the cartridge 26 in the receiver slot 72 and an unlocked position in which the cartridge 26 can be removed from the receiver slot 72. The latch can be in the locked position when the transport receiver 36 is in transit and can be in the unlocked position when the receiver slot 72 is devoid of one of the cartridges 26.

Referring to FIGS. 1 and 4A, the transport mover 30 can move the transporter 28 along an X-axis, a Y-axis, and/or about a Z-axis (indicated on FIGS. 1–3) so that the transporter 28 can be accurately positioned relative to the cartridge magazines 22 and the tape drive 14. Additionally, the transport mover 30 could be designed to move the transporter 28 about the X axis, about the Y axis, and along the Z axis. The necessity for moving the transporter 28 in these directions, and thus the design of the transport mover 30, can vary depending upon the requirements and the configuration of the storage system 10. As provided herein the transport mover 30 can include (i) a first transporter actuator (not shown) for moving the transporter 28 along the X-axis, (ii) a second transporter actuator (not shown) for moving the transporter 28 along the Y-axis, and (iii) a transporter rotator (not shown) which rotates the transporter 28 around the Z-axis. For the embodiment illustrated in FIG. 1, rotation around the Z-axis allows positioning of the transporter 28 for (i) transferring cartridges 26 between the cartridge magazine 22 and the transporter 28, and (ii) transferring cartridges 26 between the transporter 28 and the tape drive 14.

Alternatively, movement of the transporter 28 along the Y axis may not be required, as illustrated in the embodiment of FIG. 2, for example. In this embodiment, the tape drive 14 is positioned so that the cartridge receiver 58 is substantially aligned with the tape receivers 24, thereby eliminating the necessity for movement of the transporter 28 in any direction other than along the x-axis. In the embodiment illustrated in FIG. 2, the transporter mover 30 can rotate the transporter 180 degrees, or alternatively, movement of the transporter 28 about the Z-axis may not be necessary.

As provided above, the transport mover 30 moves the transporter 28 along the guide 32 between the storage rack 12 and the tape drive 14. Further, the transport mover 30 can rotate the transporter 28 along the Z-axis to align the transporter 28 with one of the tape receivers 24 in the storage rack 12 and/or with the tape drive 14. As illustrated in FIG. 4A, the transport mover 30 can include a transport guide 80 (shown in phantom on FIG. 4A) that guides the movement of the transporter 28 along the guide 32. The transport guide 80 illustrated in FIG. 4A is generally a right, cylindrical shaped, shaft that extends along the guide 32. However, the shape and design of the transport guide 80 can be varied according to the requirement of the guide 32 and the storage system 10.

FIG. 1 illustrates a storage system 10 with two storage racks 12 that are positioned at a same relative vertical positioning as the tape drive 14. In this example, the positioning of each storage rack 12 is approximately 90 degrees about the Z-axis relative to the tape drive 14. In this example, the transporter mover 30 can rotate the transporter 28 approximately 180 degrees around the Z-axis to allow accurate positioning of the transporter 28 relative to both storage racks 12, as well as to the tape drive 14.

As previously indicated, one or more guides 32 guide the movement of the transporter 28. In the embodiments illustrated herein, the guide 32 defines a guide slot 83, which guides movement of the transport guide 80. The guide 32 generally extends between the storage rack 12 and the tape drive 14. The design of the guide 32 can be varied to suit the design requirements of the transport assembly 18 and the storage system 10. For example, the guide 32 can be formed as one or more separate structures that are secured to the system housing 16. Alternatively, the guide 32 can be formed as an integral portion of the housing base 62 of the system housing 16.

The guide 32 typically includes a first end 84 and a second end 86. For instance, the first end 84 of the guide 32 can be positioned near one or more of the tape magazines 22. The guide 32 preferably extends along the X-axis from near the storage rack 12 to the second end 86 near the tape drive 14. The guide 32, and thus the guide slot 83, can be substantially linear as illustrated in FIG. 2. Alternatively, the guide 32 and/or the guide slot 83 can include deviations from a linear path. As an example, the second end 86 of the guide 32 and the guide slot 83 can turn at an angle along the Y-axis to form a "T" shape or an "L" shape (as shown in FIG. 1). With this design, the guide 32 allows the transport mover 30 to align the first transport receiver 36A or the second transport receiver 36B in front of the tape drive 14 for transferring a cartridge 26 between the tape drive 14 and the transporter 28. Alternatively, for example, the guide 32 can be configured to allow the transporter 28 to move between the storage rack 12 and more than one tape drive 14.

The cartridge mover 34 transfers the cartridges 26 between the transport receivers 36A, 36B, of the transporter 28 and the tape receivers 24. The cartridge mover 34 is preferably also used to transfer the cartridges 26 between the transport receivers 36A, 36B, and the tape drive 14. The design of the cartridge mover 34 can vary depending upon the requirements of the transporter 28, the storage rack 12 and the storage system 10.

Figure 4B:
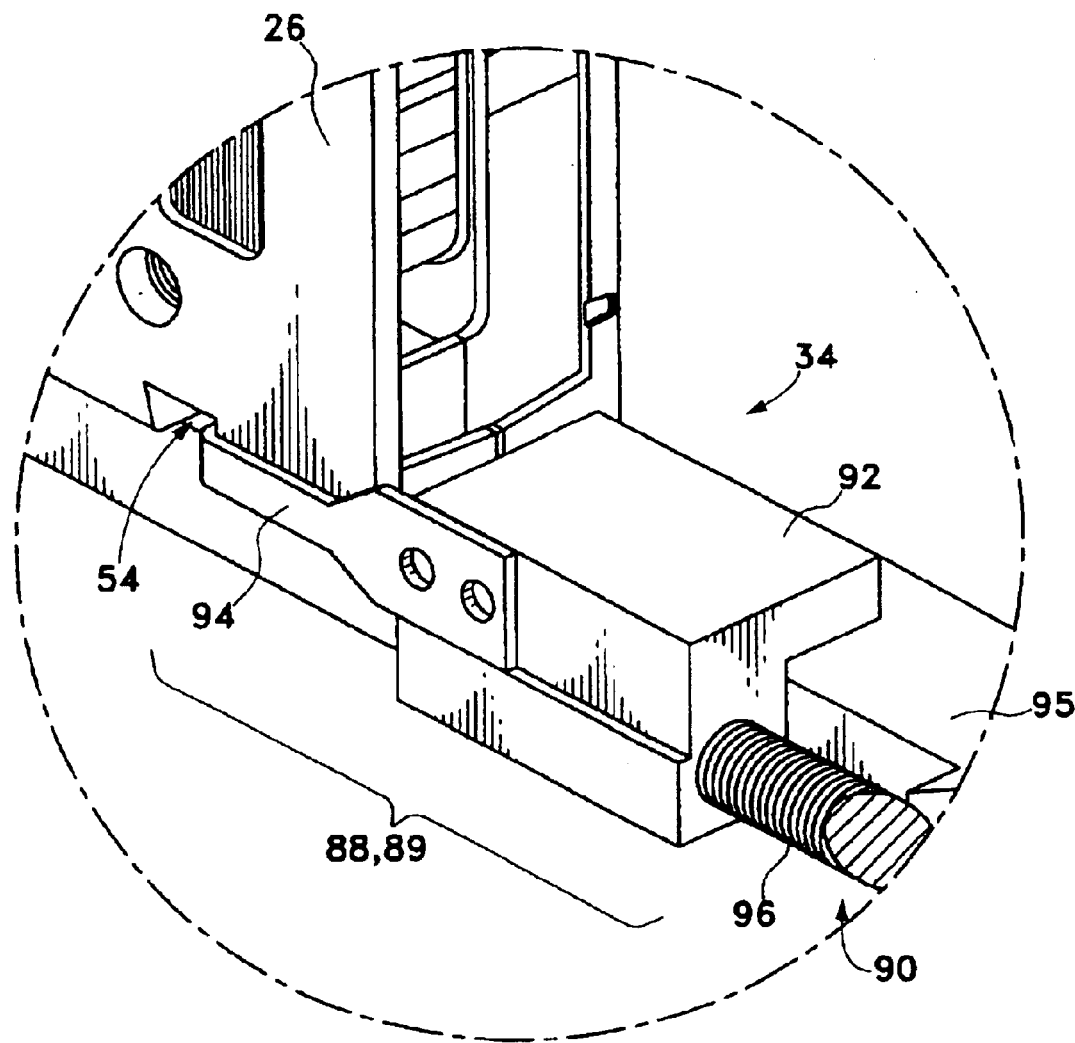
FIG. 4B is an enlarged view of a portion of FIG. 4A shown within phantom circle 4B.

Referring to FIGS. 4A and 4B, the cartridge mover 34 can include a first gripper assembly 88 that grips the first cartridge 26A and a second gripper assembly 89 that grips the second cartridge 26B. The gripper assemblies 88, 89 allow for the transfer of the cartridges 26A, 26B into and out of the first transport receiver 36A and the second transport receiver 36B of the transporter 28. The gripper assemblies 88, 89 can be designed in many ways in order to suit the requirements of the storage rack 12, the tape drives 14 and the storage system 10. Although only the first gripper assembly 88 is illustrated in FIG. 4A for clarity, FIG. 4B can represent either the first gripper assembly 88 or the second gripper assembly 89. In the embodiment illustrated in FIG. 4A, the first gripper assembly 88 includes a first gripper mover 90, a gripper mount 92, a gripper 94 that is secured to the gripper mount 92, and a mount support 95. The first gripper mover 90 moves the gripper mount 92 for selectively grasping a cartridge 26. Functionally, the first gripper mover 90 extends the gripper mount 92, and thus the gripper 94, forward to make contact with the desired cartridge 26 and subsequently retracts the gripper mount 92 and the gripper 94 to remove the cartridge 26 from one of the tape receivers 24 or the tape drive 14. The cartridge is then pulled into the first transport receiver 36A.

The design of the first gripper mover 90 can vary. The first gripper mover 90, illustrated in FIGS. 4A and 4B, includes a lead screw 96, and a gripper motor (not shown). The gripper motor can include a gripper pulley (not shown), a gripper drive belt (not shown). The gripper motor can be mounted to the receiver bottom 66, the receiver top 68, or at least one of the receiver sides 70. The gripper motor turns the gripper pulley, to which the gripper drive belt is secured. The gripper drive belt, in turn, rotates the lead screw 96. In this embodiment, the gripper mount 92 includes an internally threaded aperture (not shown) which engages the lead screw 96. With this design, rotation of the lead screw 96 causes the gripper mount 92 to extend forward toward the cartridge 26, or backward away from the cartridge 26 depending upon the direction of rotation.

The gripper mount 92 can be configured in different ways. As illustrated in FIGS. 4A and 3B, the gripper mount 92 can be generally "L" shaped, for example, and can slide along the mount support 95. The mount support 95 inhibits rotation of the gripper mount 92 during rotation of the lead screw 96. The gripper mount 92 serves at least two functions. First, the gripper mount 92 supports the gripper 94. Second, the gripper mount 92 selectively pushes the cartridge 26 from the one of the transport receivers 36A, 36B, into the tape drive 14 or into one of the tape receivers 24.

The gripper 94 engages and pulls one of the cartridges 26 from the storage rack 12 or the tape drive 14 into the transporter 28. The design of the gripper 94 can vary depending on the requirement of the cartridges 26. In the embodiments illustrated in the Figures, the gripper 94 is typically "J" or "L" shaped and engages the cartridge notch 54 for retrieval of the cartridge 26 into the transporter 28.

Figure 5:
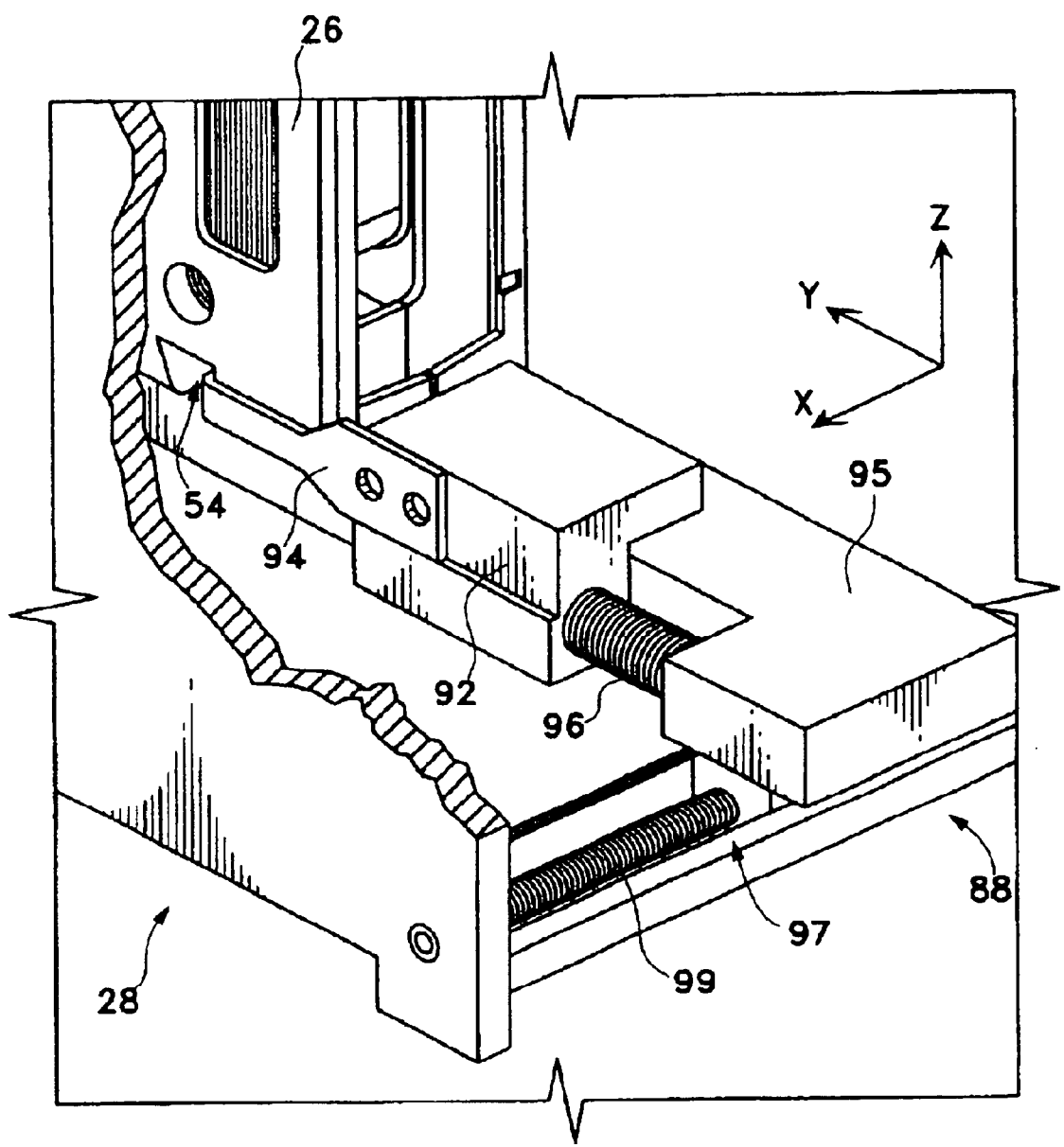
FIG. 5 is a perspective view of a portion of another embodiment of the transport assembly.

The gripper 94 can engage the cartridge notch 54 in various ways. For example, in the embodiment illustrated in FIG. 5, the first gripper assembly 88 can include a second gripper mover 97 for moving the gripper 94 laterally, i.e. along the X-axis, perpendicular to the direction of movement of the gripper mount 92. Movement along the X-axis can allow the second gripper mover 97 to position the gripper 94 for engagement with the cartridge notch 54, regardless of whether the cartridge 26 is positioned in the first transport bay 36A or the second transport bay 36B. With this design, the gripper 94 can move along both the X-axis and the Y-axis to be positioned for gripping one of the cartridges 26 in either transport bay 36A, 36B. The design of the second gripper mover 97 can be varied to suit the design requirements of the storage system.

The second gripper mover 97 includes a lead screw 99 and a second gripper motor (not shown). The second gripper motor can include a second gripper pulley (not shown), a second gripper drive belt (not shown). The second gripper motor can be mounted to the receiver bottom 66, the receiver top 68, or at least one of the receiver sides 70. The second gripper motor turns the second gripper pulley, to which the second gripper drive belt is secured. The second gripper drive belt, in turn, rotates the lead screw 99. In this embodiment, the mount support 95 includes an internally threaded aperture (not shown) which engages the lead screw 99. Rotation of the lead screw 99 causes the mount support 95 to move laterally along the X-axis, i.e. either toward the first transport bay 36A or toward the second transport bay 36B, depending upon the direction of rotation.

Operationally, the gripper mount 92 moves toward the cartridge 26 until contact between the cartridge 26 and the gripper mount 92 is made. The second gripper mover 97 then moves the gripper 94 toward the cartridge 26 until the gripper 94 engages the cartridge notch 54. The cartridge 26 can then be moved into the transporter 28 using the first gripper mover 90, as described above. Once the cartridge 26 is pulled into one of the transport receivers 36A, 36B, the second gripper mover 97 can move the gripper 94 away from the cartridge 26, thereby disengaging the gripper 94 from the cartridge notch 54. The cartridge 26 is then moved into the tape drive 14 or one of the tape receivers 24, as required, with the first gripper mover 90 which moves the gripper mount 92. In this manner, the second gripper mover 97 can extend laterally so that the first gripper assembly operates with cartridges 26 relative to the first transport receiver 36A and/or the second transport receiver 36B.

In another embodiment, the gripper 94 can be designed to engage the cartridge 26 using a gripper cam (not shown), which forces the gripper 94 away from the cartridge 26 as the gripper mount 92 moves toward the cartridge 26, yet allows the gripper 94 to engage the cartridge notch 54 once the gripper mount 92 has made contact with the cartridge 26, for example.

The second gripper assembly 89 is preferably positioned adjacent to the first gripper assembly 88, and can include substantially similar components as described above for the first gripper assembly 88. The second gripper assembly 89 preferably operates relative to the second transport receiver 36B. Moreover, additional gripper assemblies (not shown) can be incorporated into the present invention, which would operate in embodiments having more than two transport receivers 36A, 36B.

Utilizing the first gripper assembly 88 is one example of a mechanism for transferring a cartridge 26 between the storage rack 12 and the transporter 28, the tape drive 14 and the transporter 28, or both. Other suitable mechanisms can be used for the transferring of cartridges 26. For instance, as illustrated in FIG. 2, a pass-through mechanism 98 can be used, which utilizes one or more rollers 100 (only one roller 100 is shown for clarity) and a roller motor 102 (shown in phantom) for moving the cartridges 26A, 26B into and out of the transporter 28. The pass-through mechanism 98 then passes the cartridges 26A, 26B directly through the transporter 28 into the tape drive 14 or one of the tape receivers 24 following appropriate positioning of the transporter 28 by the transport mover 30.

The transport assembly 18 can be utilized in conjunction with a programmed controller (not shown) which receives cartridge selection information from a user. An example of a programmed controller is included in U.S. Pat. No. 5,760,995 issued to Heller and assigned to Quantum Corporation, the assignee of the present invention, or in U.S. Pat. No. 5,925,119 issued to Maroney and also assigned to Quantum Corporation. U.S. Pat. Nos. 5,760,995 and 5,925,119 are incorporated herein by reference.

The unique design of the transport assembly 18, which includes at least two transport receivers 36A, 36B, results in a decrease in downtime, and an increase in throughput of the storage system 10. Importantly, the transport assembly 18 can perform various functions while the first cartridge 26A is in use by the tape drive 14. For example, the transporter 28 can retrieve the second cartridge 26B from the storage rack 12 while the first cartridge 26A is being used by the tape drive 14. The second cartridge 26B can be ready for insertion into the tape drive 14 immediately upon rewinding of the first cartridge 26A. As a consequence, the present invention avoids unnecessary waiting time following rewinding of the first cartridge 26A, i.e. a cycle consisting of (i) returning the first cartridge 26A to the appropriate tape receiver 24, (ii) seeking and retrieving a second cartridge 26B into the transporter 28, and (iii) transporting the second cartridge 26B to the tape drive 14 for usage, which can amount to ten seconds or more per cycle. With the present invention, the unnecessary cycle is circumvented, resulting in waiting time of approximately one second or less.

While the particular transport assembly 18 and storage system 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A transport assembly for moving a first cartridge and a second cartridge between a storage rack and a tape drive, the tape drive including a cartridge receiver, the transport assembly comprising:

a transporter including a first transport receiver adapted to receive the first cartridge and a second transport receiver adapted to receive the second cartridge;

transport mover that moves the transporter between the storage rack and the tape drive; and cartridge mover that moves one of the cartridges between the storage rack and one of the transport receivers, the cartridge mover including a gripper that grips one of the cartridges, a first gripper mover that moves the gripper along a first axis relative to the transporter, and a second gripper mover that moves the gripper to move one of the cartridges relative to the transporter along a second axis that is angled relative to the first axis.

2. The transport assembly of claim 1 wherein the first axis is substantially perpendicular to the second axis.

3. The transport assembly of claim 1 wherein the transport mover moves the transporter along an X axis, along a Y axis and about a Z axis that is substantially perpendicular to the X axis and the Y axis.

4. The transport assembly of claim 3 wherein the storage rack includes a plurality of tape receivers, and wherein the transport mover rotates the transporter between zero degrees and approximately 180 degrees about the Z axis to transport one of the cartridges between one of the tape receivers and the cartridge receiver.

5. The transport assembly of claim 3 wherein the storage rack includes a plurality of tape receivers, and wherein the transport mover rotates the transporter at least approximately 90 degrees about the Z axis to transport one of the cartridges between one of the tape receivers and the cartridge receiver.

6. The transport assembly of claim 1 further including a guide that extends substantially between the storage rack and the tape drive, the transport mover moving the transporter between the storage rack and the tape drive along the guide.

7. A storage system including a storage rack, a tape drive and the transport assembly of claim 1 that is positioned near the storage rack and the tape drive, the storage rack including a plurality of tape receivers and a transporter sensor, the sensor detecting alignment of the transporter relative to at least one of the tap receivers.

8. A method for moving a first cartridge and a second cartridge between a storage rack and a tape drive, the method comprising the steps of:

gripping a first cartridge with a gripper;

moving the gripper along a first axis relative to a transporter with a first gripper mover to move the first cartridge into a first transport receiver of the transporter, the transporter being movable relative to the storage rack; and moving the gripper substantially parallel to a second axis relative to the transporter with a second gripper mover to move the first cartridge toward a second transport receiver of the transporter, the second axis being angled relative to the first axis.

9. The method of claim 8 further comprising the step of moving the transporter with a transport mover to transport one of the cartridges to the tape drive.

10. The method of claim 9 wherein the step of moving the transporter includes moving the transporter along an X axis, along a Y axis and about a Z axis that is substantially perpendicular the X and Y axes.

11. The method of claim 8 further comprising the steps of gripping a second cartridge with the gripper, and moving the gripper along the first axis relative to the transporter with the first gripper mover to move the second cartridge into the first transport receiver of the transporter while the first cartridge is positioned in the transporter.

12. The method of claim 11 wherein each of the steps are performed without moving the transporter relative to the storage rack.

13. A transport assembly for moving a first cartridge and a second cartridge between a storage rack and a tape drive, the tape drive including a cartridge receiver, the transport assembly comprising:

transporter including a first transport receiver that receives the first cartridge and a second transport receiver that receives the second cartridge;

transport mover that moves the transporter relative to the storage rack and the tape drive, the transport mover moving the transporter along an X axis and a axis, and rotating the transporter about a Z axis that is substantially perpendicular to the X and Y axes; and cartridge mover that moves one of the cartridges between the storage rack an one of the transport receivers, the cartridge mover including (i) a gripper assembly that grips one of the cartridges, (ii) a first gripper mover that moves the gripper assembly along a first axis relative to the transporter, and (iii) a second gripper mover that moves the gripper assembly along a second axis relative to the transporter, the second axis being angled relative to the first axis.

14. The transport assembly of claim 13 wherein the first axis is substantially perpendicular to the second axis.

15. The transport assembly of claim 13 wherein the X axis is substantially perpendicular to the Y axis.

16. The transport assembly of claim 13 wherein the storage rack includes a plurality of tape receivers, and wherein at least one of the tape receivers is angled relative to the cartridge receiver.

17. The transport assembly of claim 13 wherein the transport mover rotates the transporter between approximately zero degrees and approximately 180 degrees about the second axis.

18. The transport assembly of claim 13 wherein the transport mover rotates the transporter at least approximately 90 degrees about the second axis.

19. A storage system including a storage rack and the transport assembly of claim 13 positioned near the storage rack.

20. The storage system of claim 19 wherein the storage rack includes a plurality of tape receivers and a transporter sensor, the sensor detecting alignment of the transporter relative to at least one of the tape receivers.

21. A transport assembly for moving a first cartridge and a second cartridge between a storage rack and a tape drive, the storage rack including a plurality of tape receivers, the tape drive including a cartridge receiver, the transport assembly comprising:

transporter that includes a first transport receiver that receives the first cartridge and a second transport receiver that receives the second cartridge, the transporter being movable relative to the storage rack; and a gripper that grips one of the cartridges and moves one of the cartridges into the transporter, the gripper moving one of the cartridges along a first axis relative to the transporter and along a second axis relative to the transporter that is different than the first axis.

22. The transport assembly of claim 21 wherein the first axis is substantially perpendicular to the second axis.

23. The transport assembly of claim 21 wherein at least one of the tape receivers is angled relative to the cartridge receiver.

24. The transport assembly of claim 21 further comprising a over that rotates the gripper between approximately zero degrees and approximately 180 degrees about a third axis that is different than the first and second axes.

25. The transport assembly of claim 24 wherein the mover rotates the gripper at least approximately 90 degrees about the third axis.

26. The transport assembly of claim 24 further comprising a first gripper mover that moves the gripper along the first axis relative to the transporter, and a second gripper mover that moves the gripper along second axis relative to the transporter.

27. The transport assembly of claim 26 wherein the third axis is substantially perpendicular to the first axis.

28. The transport assembly of claim 26 wherein the second axis is substantially perpendicular to the first axis and the third axis.

29. The transport assembly of claim 24 wherein the mover rotates the transporter and the gripper assembly simultaneously about the third axis.

30. A storage system including a storage rack and the transport assembly of claim 21 positioned near the storage rack.

31. The storage system of claim 30 wherein the storage rack includes a plurality of tape receivers and a transporter sensor, the sensor detecting alignment of the transporter relative to at least one of the tape receivers.

32. A transport assembly for moving a first cartridge and a second cartridge between a storage rack and a tape drive, the tape drive including a cartridge receiver, the transport assembly comprising:

a transporter including a first transport receiver that receives the first cartridge and a second transport receiver that receives the second cartridge;

a transport mover that moves the transporter between the storage rack and the tape drive; and a cartridge mover that moves one of the cartridges between the storage rack and one of the transport receivers, the cartridge mover including a gripper assembly that grips one of the cartridges, a first gripper mover that moves the gripper assembly along a first axis relative to the transporter, and a second gripper mover that moves the gripper assembly between the first transport receiver and the second transport receiver along a second axis relative to the transporter, the second axis being angled relative to the first axis.

33. The storage system of claim 32 wherein the first axis is substantially perpendicular to the second axis.

34. A transport assembly for moving a first cartridge and a second cartridge between a storage rack and a tape drive, the tape drive including a cartridge receiver, the transport assembly comprising:

transporter including a first transport receiver that receives the first cartridge and a second transport receiver that receives the second cartridge;

transport mover that moves the transporter between the storage rack and the tape drive; and a cartridge mover that moves one of the cartridges between the storage rack an one of the transport receivers, the cartridge mover including a gripper assembly that grips one of the cartridges, a first gripper mover that moves the gripper assembly along a first axis relative to the transporter, and a second gripper mover that moves the gripper assembly relative to the transporter substantially parallel to a second axis that extends between the first transport receiver and the second transport receiver.

35. The transport assembly of claim 34 wherein the first axis is substantially perpendicular to the second axis.

36. The transport assembly of claim 34 wherein the transport mover rotates the transporter about a third axis that is different than the first and second axes.

37. The transport assembly of claim 36 wherein the transport mover rotates the transporter between approximately zero degrees and approximately 180 degrees about the third axis.

38. The transport assembly of claim 36 wherein the third axis is substantially perpendicular to the first axis and the second axis.

39. The transport assembly of claim 34 wherein the transport mover moves the transporter substantially parallel to the second axis and about a third axis that is substantially perpendicular to the second axis.

40. The transport assembly of claim 34 further including a guide that extends at least partially between the storage rack and the tape drive, the transport mover moving the transporter between the storage rack and the tape drive along the guide.

41. A storage system including a storage rack, a tape drive and the transport assembly of claim 34 that is positioned near the storage rack and the tape drive, the storage rack including a plurality of tape receivers and a transporter sensor, the sensor detecting alignment of the transporter relative to at least one of the tap receivers.

* * * * *

UNITED STATES PATENT AND TRADEMARK OFFICE
CERTIFICATE OF CORRECTION

PATENT NO. : 6,900,960 B2
DATED : May 31, 2005
INVENTOR(S) : Gariepy et al.

It is certified that error appears in the above-identified patent and that said Letters Patent is hereby corrected as shown below:

Column 9,
Lines 59-60 and 61, please delete the phrase "adapted to receive" and substitute therefore -- that receives --.
Line 62, please insert an -- a -- before "transport mover".
Line 64, please insert an -- a -- before "cartridge mover".

Column 10,
Line 65, please insert an -- a -- before "transporter including".

Column 11,
Line 1, please insert an -- a -- before "transport mover".
Line 6, please insert an -- a -- before "cartridge mover".
Line 38, please insert an -- a -- before "transporter that".
Line 53, please delete the word "over" and substitute therefore -- mover --.

Column 12,
Line 2, please delete the word "assembly".
Line 34, please insert an -- a -- before "transporter including".
Line 37, please insert an -- a -- before "transport mover".

Signed and Sealed this

Sixteenth Day of August, 2005

JON W. DUDAS
*Director of the United States Patent and Trademark Office*